April 28, 1931.  Y. SAKAKURA  1,802,838
INCANDESCENT LAMP
Filed Oct. 23, 1926
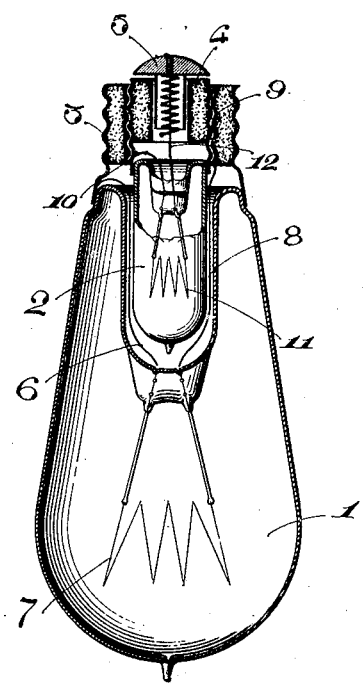
Inventor
Yukitoshi Sakakura
By Marion & Marion
Attorneys Patented Apr. 28, 1931

1,802,838

UNITED STATES PATENT OFFICE

YUKITOSHI SAKAKURA, OF TOKYO-FU, JAPAN

INCANDESCENT LAMP

Application filed October 23, 1926, Serial No. 143,732, and in Japan November 11, 1925.

This invention relates to improvements in incandescent lamps in which an incandescent lamp is arranged within another and so connected that either or both of said lamps may be illuminated at will.

The object of the invention is to provide a novel incandescent lamp characterized in that either of the incandescent lamps may be renewed, irrespective of the other, at the breakage of its filament, whereby a considerable economy is obtained.

The accompanying drawing shows a longitudinal sectional view of an incandescent lamp embodying the present invention.

Referring more particualrly to the drawing, (1) is an outer incandescent lamp, (2) is an inner incandescent lamp, (3) is the base of the outer lamp and (4) is the base of the inner lamp. A contact piece (5) is provided with a spring and disposed at the upper end of the inner lamp base. In the example shown, an inner base (9) is provided at the centre of the base of the outer lamp, insulated from each other, to form a screw socket into which the base (2) of the inner lamp is screwed. The filaments of the outer and inner lamps may respectively be of the desired illuminating power.

When the lamp is lighted the current passes from the base (3) to the leading-in wire (6), filament (7) and the leading-in wire (8) at the other side, and after passing through the inner base (9) of the outer lamp is led to the base (4) of the inner lamp wherefrom the current further flows through the leading-in wire (10), filament (11) and the leading-in wire (12) at the other side, and finally to the contact spring contact piece (5) whereby a closed circuit is formed. In this case, both of the filaments (7) and (10) may be illuminated at the same time or one of the filaments illuminated and the other acting as a resistance, by properly determining the relative size of the filaments.

When the lamp is further screwed into the socket the contact piece (5) being pressed, is brought in contact with the base (4) of the inner lamp whereby the filament (11) becomes excluded out of the circuit and the outer lamp only is illuminated.

In the double-filament lamps or so-called high-low lamps hitherto known, two or more filaments are arranged in the one and same lamp and the illuminating power of the lamp is varied by changing the circuit. When either one of the filaments is broken, the lamp is no longer useful and should be scrapped because of the fact that the broken filament cannot be easily replaced. Whereas, according to the present invention, an independent incandescent lamp is combined within another incandescent lamp so that the illuminating power may be varied by flowing the current through either one or both of said two incandescent lamps. At the breakage of the filament, therefore, the concerned lamp only may be renewed irrespective of the other, and a considerable economy thereby obtained in comparison with the high-low lamps hitherto in use.

Having now particularly described and ascertained the nature of my said invention and in what manner the same is to be performed I declare that what I claim is:—

1. A improved incandescent electric lamp, comprising a main electric lamp having an inside stem and a lamp receiving recess in the stem thereof, a second smaller lamp detachably fitted inside the stem of the main lamp, a threaded ferrule on said small lamp, and means associated with the said ferrule whereby either lamp may be illuminated at will.

2. In an improved incandescent electric lamp, a main electric lamp having an enlarged internal stem, a hollow ferrule on said lamp threaded internally and externally, a tubular small lamp removably disposed inside the stem of the main lamp, a ferrule on said small lamp screwed inside the first ferrule, and a spring actuated contact inside the small lamp ferrule normally out of engagement therewith and adapted to contact with the small ferrule when the complete lamp is fully screwed into a lamp socket.

In testimony whereof I have affixed my signature.

YUKITOSHI SAKAKURA.